United States Patent [19]
Fukui

[11] Patent Number: 5,917,546
[45] Date of Patent: Jun. 29, 1999

[54] IMAGING APPARATUS

[75] Inventor: Hiroshi Fukui, Kanagawa, Japan

[73] Assignee: Sony Corporation, Tokyo, Japan

[21] Appl. No.: 08/618,999

[22] Filed: Mar. 21, 1996

[30]    Foreign Application Priority Data

Mar. 24, 1995  [JP]  Japan .................................... 7-066426

[51] Int. Cl.$^6$ ................................................... H04N 3/14
[52] U.S. Cl. ........................... 348/296; 348/323; 348/321
[58] Field of Search .................................. 348/296, 322, 348/323, 321

[56]              References Cited

U.S. PATENT DOCUMENTS

| 4,472,741 | 9/1984  | Takatsu et al. ........................ | 348/323 |
| 4,984,002 | 1/1991  | Kokubo ................................. | 348/296 |
| 5,298,734 | 3/1994  | Kokubo ................................. | 348/322 |
| 5,463,421 | 10/1995 | Deguchi et al. ....................... | 348/222 |
| 5,663,761 | 9/1997  | Fukui .                                |         |

OTHER PUBLICATIONS

Patent Abstracts of Japan, vol. 095, No. 3, Mar. 20, 1995 & JP 07 79372 Mar. 20, 1995.
Patent Abstracts of Japan, vol. 13, No. 144 (E–740), p. 140, Apr. 10, 1989, & JP 63 306779 Dec. 14, 1988.
Patent Abstracts of Japan, vol. 94, No. 12, Dec. 6, 1994, & JP 06 339077 Dec. 6, 1994.

*Primary Examiner*—Wendy Garber
*Assistant Examiner*—Aung S. Moe
*Attorney, Agent, or Firm*—Frommer Lawrence & Haug, LLP.; William S. Frommer

[57]               ABSTRACT

An imaging apparatus in which the dynamic range can be substantially increased even with the use of a solid image sensor, such as a CCD image sensor. The imaging apparatus includes a solid-state imaging unit for reading out two picture signals with different signal charge storage time durations via a vertical transfer section and via first and second horizontal transfer sections for outputting all-pixel picture signals on the field basis, and a shutter control unit for providing different signal charge storage time durations of the solid-state imaging unit. The imaging apparatus also includes a synthesizing unit for synthesizing the two picture signals with different signal charge storage time durations produced by the shutter control unit.

7 Claims, 11 Drawing Sheets

FIG.4A VD
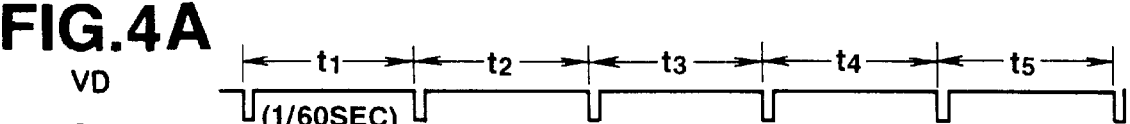
FIG.4B READOUT PULSE RP
SHUTTER CONTROL PULSE
FIG.4C
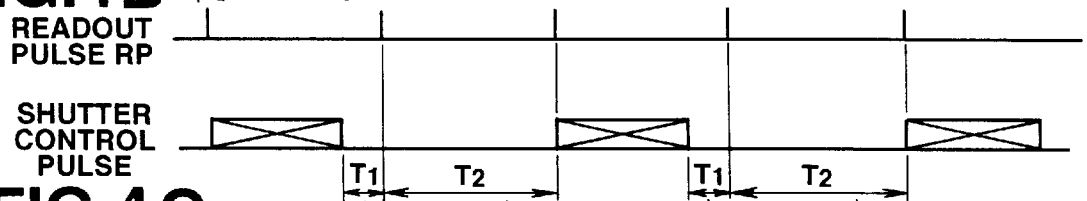
FIG.4D SIG₁
FIG.4E SIG₂
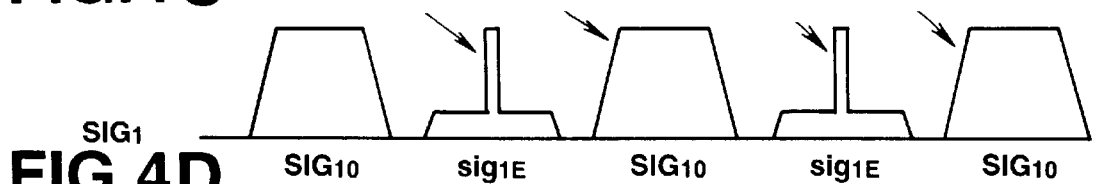
FIG.4F SIG₂'
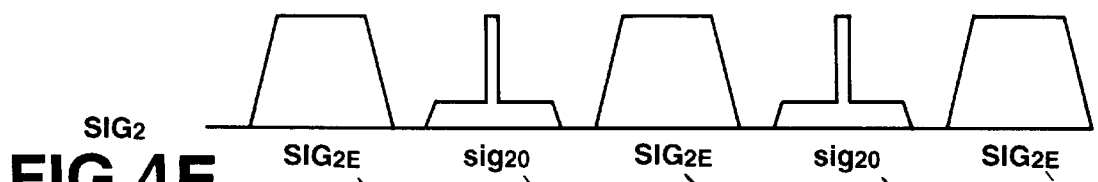
FIG.4G SIG₃
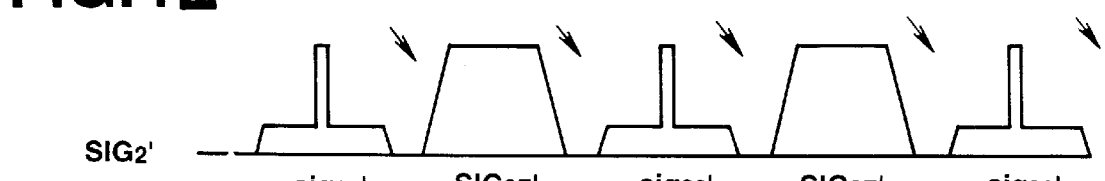
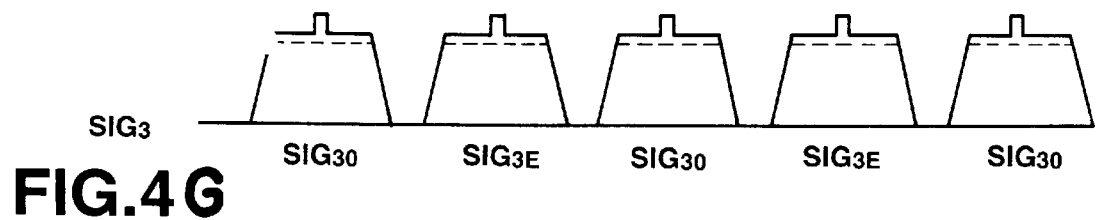

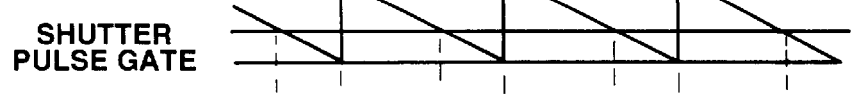
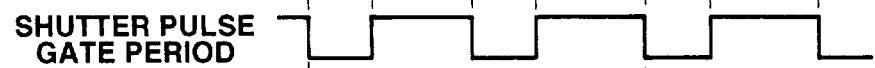
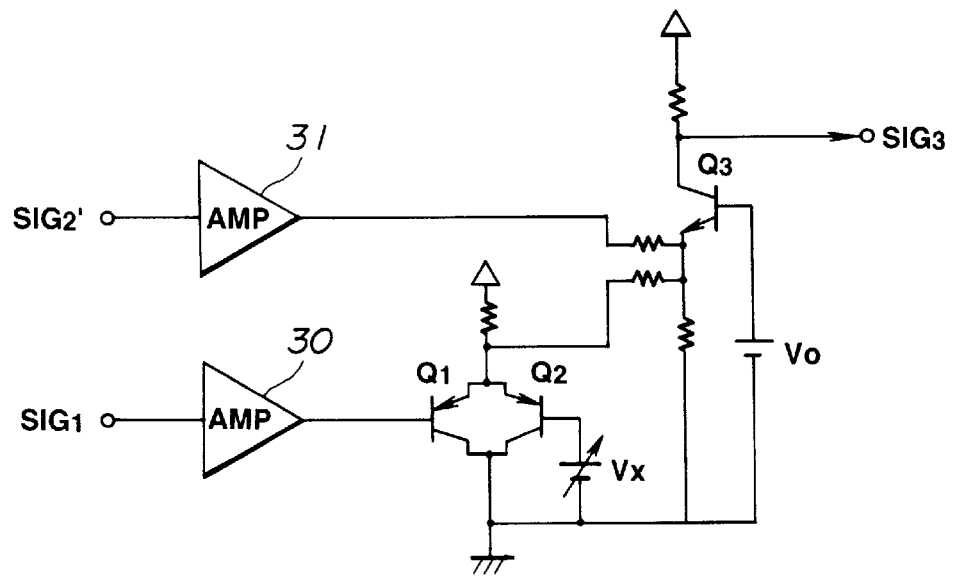
FIG.7

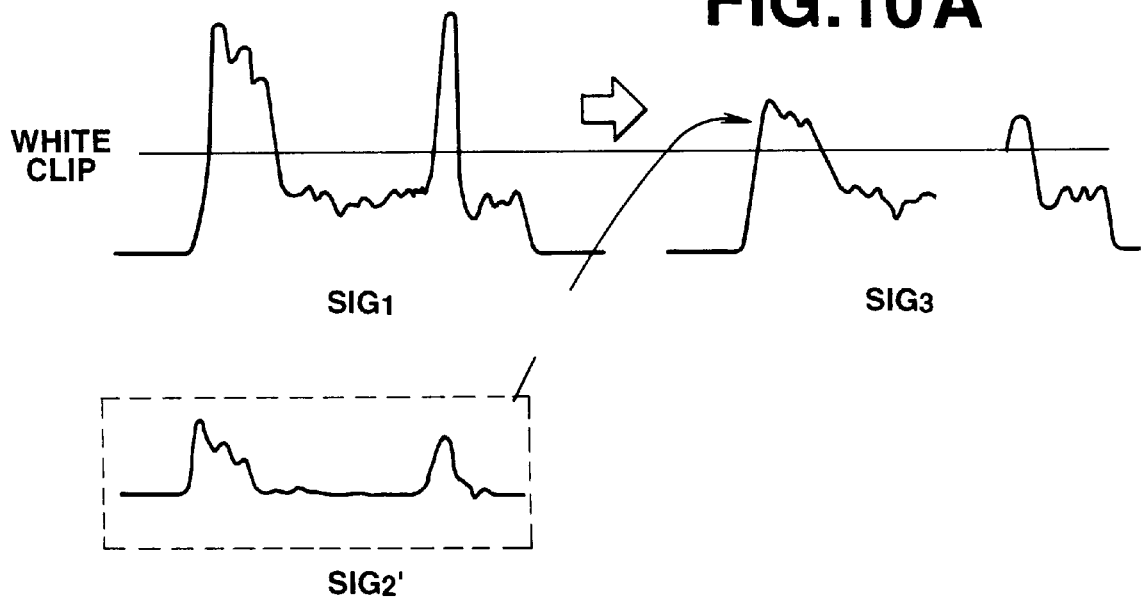
FIG.10A
FIG.10B
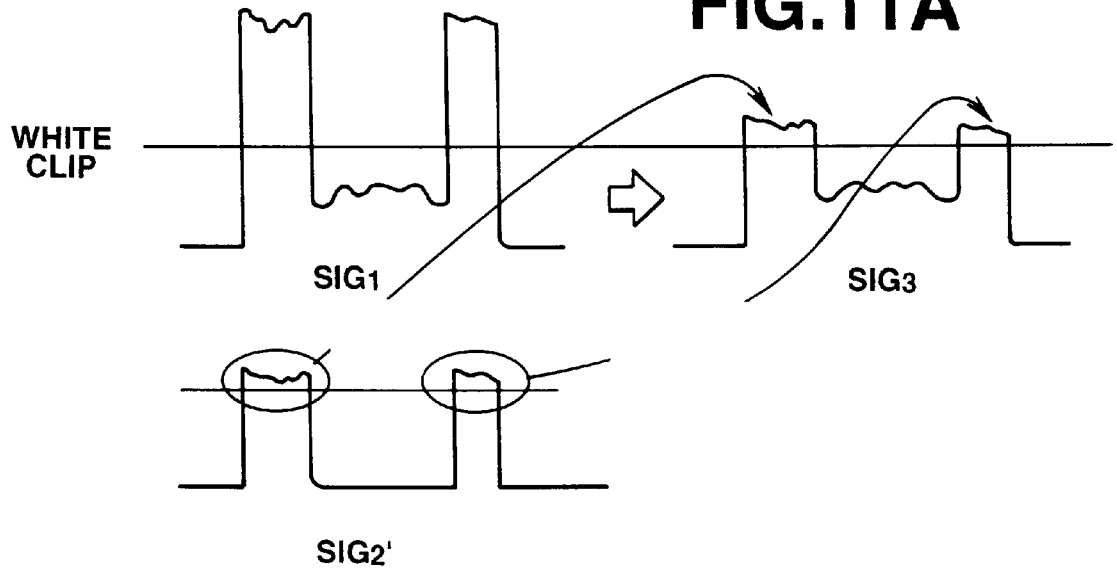
FIG.11A
FIG.11B

IMAGING APPARATUS

BACKGROUND OF THE INVENTION

This invention relates to an imaging apparatus in which the dynamic range can be substantially increased even with the use of a solid image sensor, such as a CCD image sensor.

An imaging apparatus (imager) is in extensive use in a video tape recorder (VTR) with a built-in camera or as a video camera unit of a still video camera. As an imager for this video camera unit, a solid-state image sensor, such as a CCD image sensor, has come into widespread use.

As compared to, for example, a silver salt photographic system, the solid state image sensor has a narrow dynamic range. Thus, during imaging in backlight, a reproduced picture exhibits an extremely high or low luminance level.

In such case, it has been customary with the conventional imager to adjust the diaphragm for achieving an optimum light exposure volume for a main object. However, if only the diaphragm is adjusted, so-called white-skip is produced in the background, even if an optimum reproduced picture corresponding to the main object is obtained, such that the background picture is a of plain white color due to the white skip.

Thus it has been customary to compress the level of an output for the standard light to a range within approximately 1.0 $V_{p-p}$ by knee processing, as shown in FIG. 1. That is, if, with the conventional imager employing the solid-state image sensor, the incident light volume indicated on the abscissa in FIG. 1 is increased, the picture output level shown on the ordinate is increased linearly, such that an output beyond the range of approximately 1.0 $V_{p-p}$ is produced and hence the output picture is of a plain white color. Thus, knee processing is performed as indicated in FIG. 1 by way of level compression. That is, the dynamic range with respect to the incident light is increased by compressing the output level with respect to the incident light. The picture signal, thus level-compressed by the knee processing, has a maximum of four-fold to five-fold dynamic range with respect to the standard light.

Recently, a high-quality picture has been desired in the field of a video camera, and a broader dynamic range is needed, such that dynamic range expansion by level compression of the output exceeding the standard light by the above-mentioned knee processing is felt to be insufficient.

On the other hand, the usage of special effect pictures is also increased, such that facilitated control of the level compression is desired.

SUMMARY OF THE INVENTION

It is therefore an object of the present invention to provide an imaging apparatus in which the output level relative to the incident light can be compressed significantly for enhancing the dynamic range with respect to the incident light and in which the compression ratio can be controlled easily and the amount of CCD charges during the standard operation can be set to a higher value for enabling the S/N ratio to be improved.

In one aspect, the present invention provides an imaging apparatus including solid-state imaging means for reading out two picture signals with different signal charge storage time durations via a vertical transfer section and via first and second horizontal transfer sections for outputting all-pixel picture signals on the field basis, shutter control means for providing different signal charge storage time durations of the solid-state imaging means and synthesizing means for synthesizing the two picture signals with different signal charge storage time durations produced by the shutter control means.

In another aspect, the present invention provides an imaging apparatus including light splitting means for splitting the incident light into two light portions, first solid-state imaging means for producing standard picture signals from one of the two light portions, second solid-state imaging means for processing the other light portion with signal charge storage time shortening for producing a compressed picture signal, and synthesizing means for synthesizing standard picture signals of the first solid-state imaging means to the compressed picture signals of the second solid-state imaging means.

With the imaging apparatus of the present invention, since the picture signals of the standard light exposure is synthesized to the compressed picture signals with the signal charge storage time shortened responsive to electronic shutter control, the output level compression ratio relative to the incident light can be improved over the value achieved with the conventional technique.

With the imaging apparatus in the first aspect, two picture signals with different signal charge storage time durations, produced by the electronic shutter control, are read out via the vertical transfer section and via two horizontal transfer sections, and all-pixel picture signals are outputted and synthesized on the field basis. This achieved significant output level compression relative to the incident light and a wider dynamic range as well a facilitated control of the compression ratio and setting of the CCD charge for normal operation to a higher value, in addition to the improved S/N ratio.

With the imaging apparatus in the second aspect, the incident light is split into two light portions from which picture signals of the standard light exposure and compressed picture signals responsive to the electronic shutter control are derived and synthesized together. The effect is similar to that achieved with the first aspect of the invention, that is, significant output level compression relative to the incident light and a wider dynamic range as well a facilitated control of the compression ratio and setting of the CCD charge for normal operation to a higher value in addition to improved S/N ratio.

BRIEF DESCRIPTION OF THE DRAWINGS

FIG. 4 is a timing chart for illustrating the operation of the first embodiment.

FIGS. 6A, 6B, 6C, 6D and 6E are timing charts for illustrating the operation of the shutter control circuit shown in FIG. 5.

FIG. 7 is a circuit diagram showing a signal addition type synthesis circuit of the first embodiment.

FIG. 10 is a waveform diagram for illustrating the operation of the signal addition type synthesis circuit shown in FIG. 7.

FIG. 11 is a waveform diagram for illustrating the operation of the signal comparison synthesis type synthesis circuit shown in FIG. 8.

EMBODIMENTS

Figure 1:
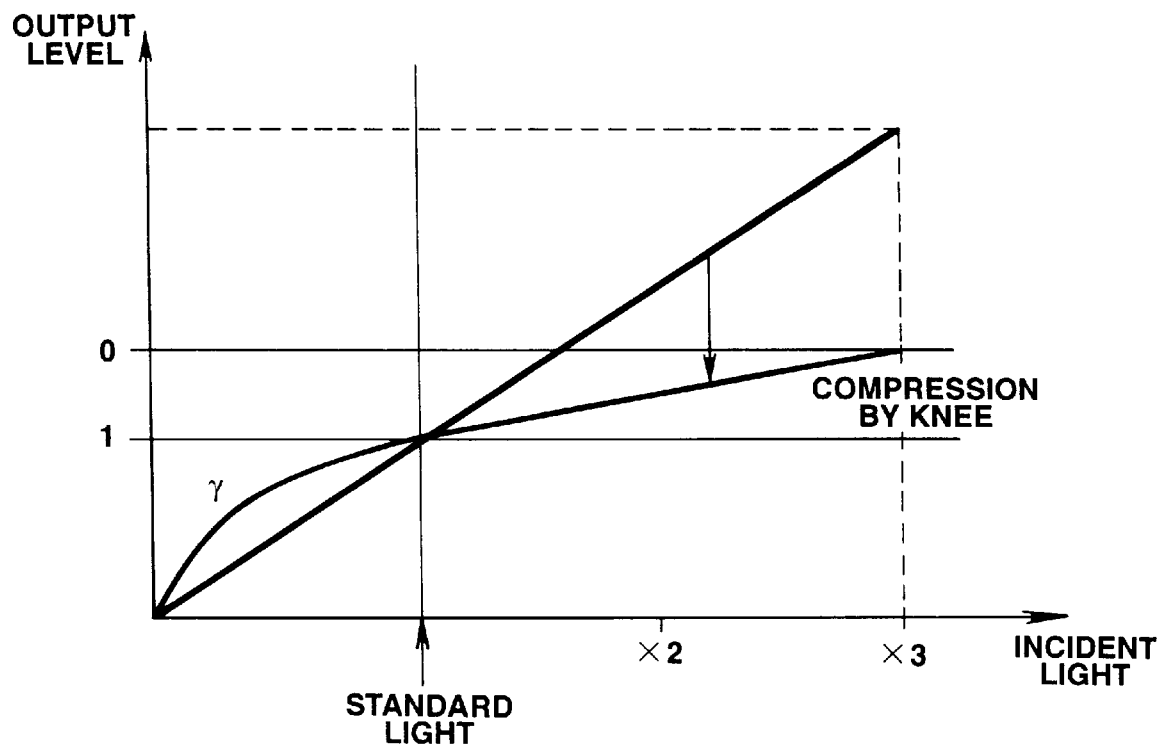
FIG. 1 is a graph for illustrating output level compression by knee processing.

Referring to the drawings, preferred embodiments of the present invention will be explained in detail.

Figure 2:
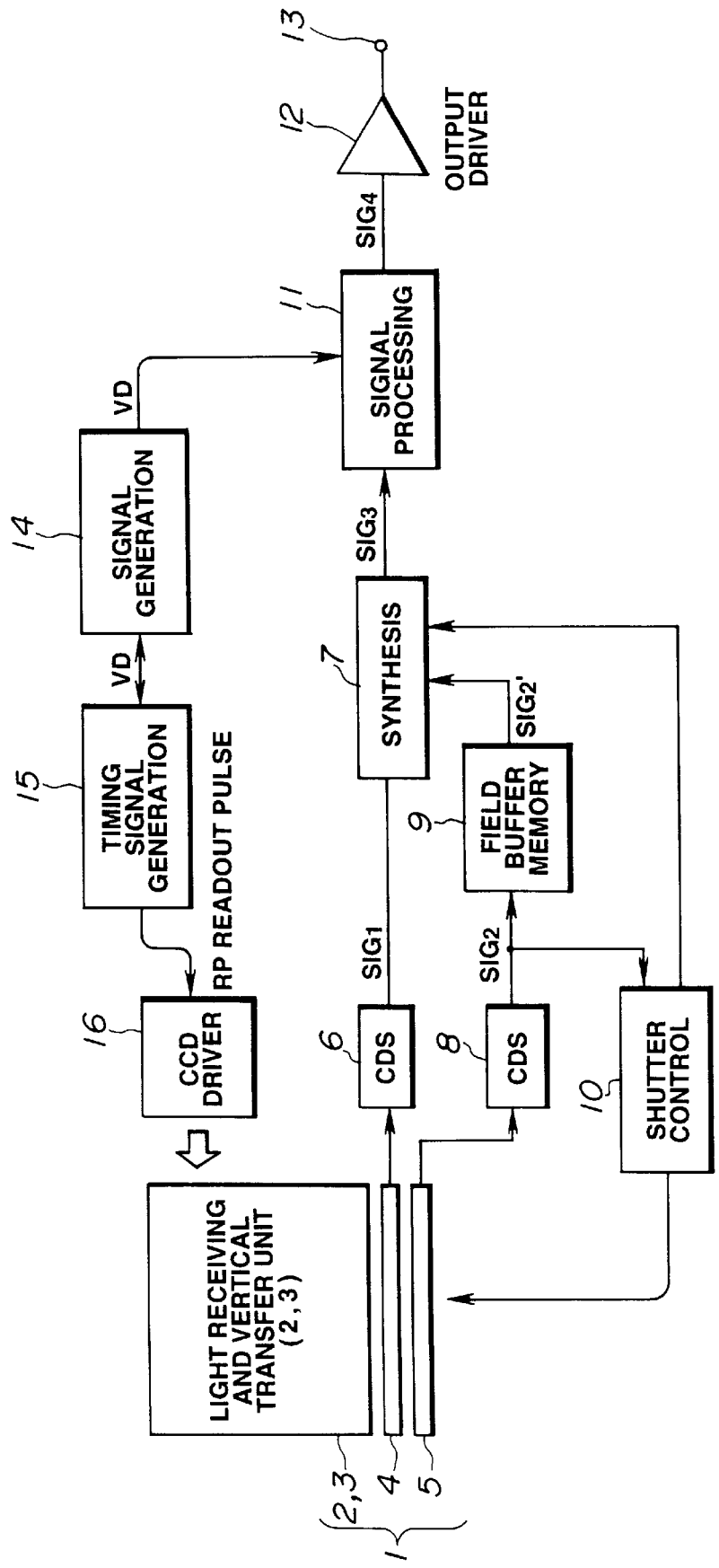
FIG. 2 is a schematic block diagram showing a first embodiment of an imager according to the present invention.

FIG. 2 shows a first embodiment of the imaging apparatus comprised of an all-pixel-readout type CCD image sensor 1 in which two picture signals obtained with different signal charge storage time durations are read out via a vertical transfer unit 3 and horizontal transfer sections 4 and 5 for outputting the picture signals of all pixels on the field basis. The imaging apparatus also includes a shutter control circuit 10 for providing the different signal charge storage time durations of the all-pixel-readout type CCD image sensor 1 and a synthesis circuit 7 for synthesizing the two picture signals produced with the differential signal charge storage time durations by the shutter control circuit 10.

Figure 3:
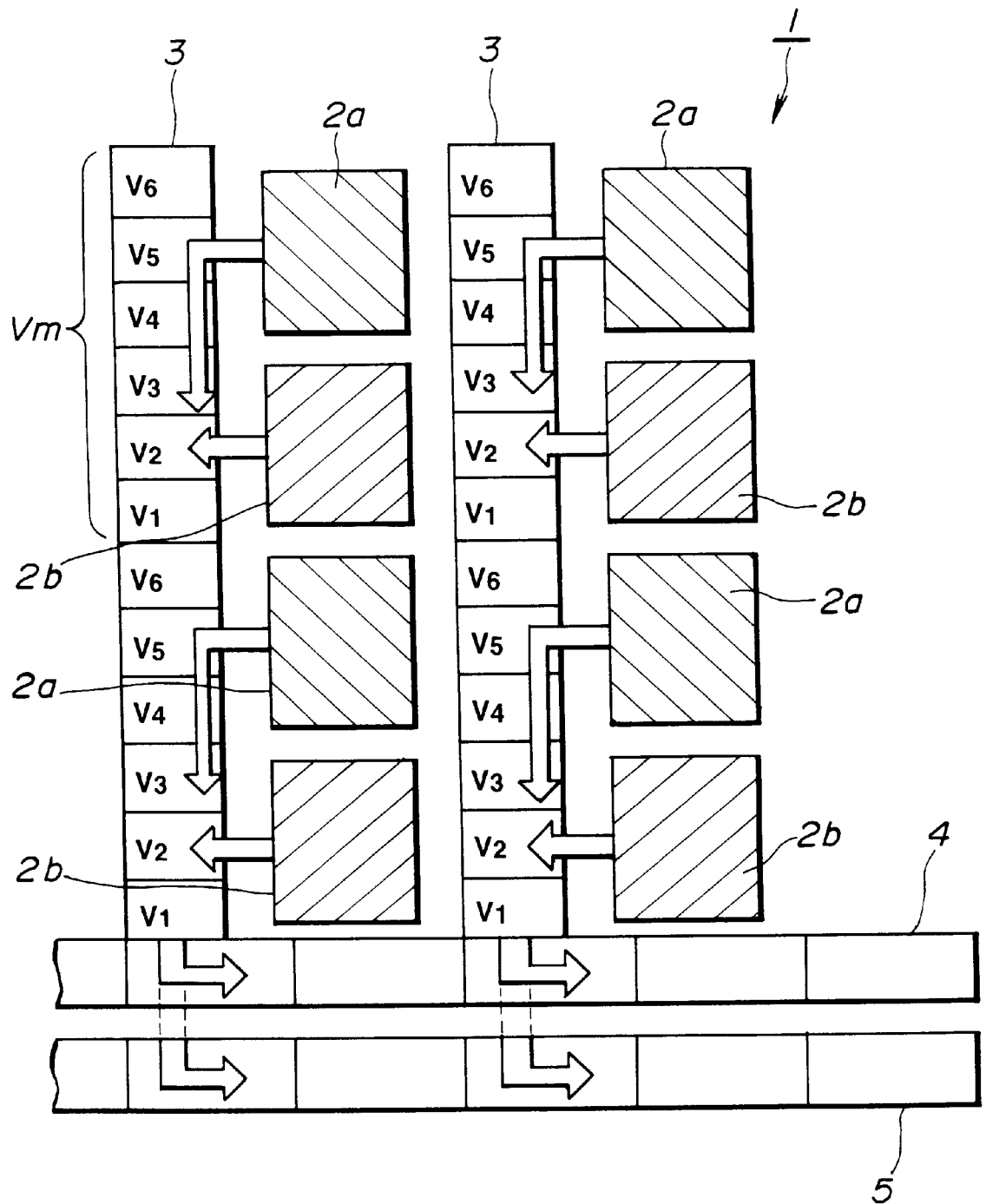
FIG. 3 illustrates the structure of a all-pixel-readout type CCD image sensor according to the first embodiment.

The all-pixel-readout type CCD image sensor 1 has a matrix array of light receiving elements 2a and light receiving elements 2b making up a light receiving section 2, as shown in FIG. 3. The light receiving elements 2a are those for odd field lines (ODD field lines) of two fields making up a frame, while the light receiving elements 2b are those for even field lines (EVEN field lines) of the two fields. The light receiving elements 2a and 2b are comprised of, for example, photo-diodes.

In the vertical direction, along which the light receiving elements 2a, 2b are alternately arrayed, there are formed vertical transfer sections 3. Each vertical transfer section 3 has a transfer electrode $V_m$, comprised of a sum total of six transfer electrodes $V_1, V_2, \ldots V_6$, inclusive of the transfer electrode $V_5$ for transferring picture signals from the light receiving element 2a and the transfer electrode $V_2$ for transferring picture signals from the light receiving element 2b. The number of the vertical transfer sections $V_m$ corresponds to the number of the light receiving element 2a or 2b.

In addition, the all-pixel-readout type CCD image sensor 1 has two horizontal transfer sections 4 and 5 for horizontally transferring picture signals. The horizontal transfer sections 4 and 5 alternately transfer picture signals of the ODD field lines read out from the light receiving elements 2b and picture signals of the EVEN field lines read out from the light receiving elements 2a every 1/60 second in the horizontal direction.

The picture signals of the ODD field lines or the EVEN field lines, alternately transferred from the horizontal transfer section 4 every 1/60 second, are supplied to a correlated double sampling (CDS) circuit 6 so as to be freed of noise components. A CDS picture signal $SIG_1$, outputted from the CDS processing circuit 6, is supplied to a synthesis circuit 7.

The picture signals of the ODD field lines or the EVEN field lines from the horizontal transfer section 5, alternated with each other every 1/60 second, are supplied to a CDS circuit 8 so as to be freed of noise components. A CDS picture signal $SIG_2$, outputted from the CDS processing circuit 8, is supplied to a field buffer memory 9 and to a shutter control circuit 10.

The shutter control circuit 10 controls signal charge storage time duration of the all-pixel-readout type CCD image sensor 1 using the electronic shutter function. Specifically, the shutter control of the shutter control circuit 10 is turned off and on for producing a standard picture signal by the standard charge storage time and for producing compressed picture signals by the shortened charge storage time, respectively. To this end, the CDS picture signal $SIG_1$, outputted from the CDS processing circuit 6, is divided into ODD field components of the standard light exposure $SIG_{1O}$ and EVEN field components of shortened signal charge storage time $SIG_{1E}$. The CDS picture signal $SIG_2$, outputted from the CDS processing circuit 8, is divided into EVEN field components of the standard light exposure $SIG_{2E}$ and ODD field components of shortened signal charge storage time $SIG_{2O}$.

The field buffer memory 9 writes or reads the CDS picture signals $SIG_2$ of the CDS processing circuit 8 in accordance with write or readout pulses as later explained.

The synthesis circuit 7 synthesizes the CDS picture signals $SIG_1$, outputted by the CDS processing circuit 6, to the CDS picture signal $SIG_2'$, outputted by the field buffer memory 9, to transmit a resulting synthesized picture signal $SIG_3$ to the signal processing circuit 11.

The signal processing circuit 11 encodes the synthesized signal $SIG_3$ of the synthesis circuit 7 responsive to the vertical synchronization pulse VD and the horizontal synchronization pulse HD from the signal generating circuit 14 for taking out a picture signal $SIG_4$. The picture signal $SIG_4$, a processing output of the signal processing circuit 11, is taken out via an output driver 12 at an output terminal 13.

The vertical synchronization pulse VD and the horizontal synchronization pulse HD of the signal generating circuit 14 are also supplied to a timing signal generating circuit 15. The timing signal generating circuit 15 generates a readout pulse RP of the all-pixel-readout type CCD image sensor 1 from the vertical synchronization pulse VD and the horizontal synchronization pulse HD and provides the readout pulse RP via the CCD driver 16 to the all-pixel-readout type CCD image sensor 1.

Referring to FIG. 4, the operation of the first embodiment, the basic structure of which has been explained above, is now explained.

In FIG. 4, the vertical synchronization pulse signal VD is a pulse signal having a field frequency which is 60 Hz and 50 Hz in the NTSC system and in the PAL system, respectively. This pulse signal is generated by the signal generating circuit 14 and supplied to the signal generating circuit 11 and to the timing signal generating circuit 15.

The readout pulse RP is generated by the timing signal generating circuit 15 and transmitted via the CCD driver 16 to the all-pixel-readout type CCD image sensor 1.

The shutter control pulses are generated by the shutter controlling circuit 10. The shutter control pulses control the signal charge storage time responsive to the light incident on the all-pixel-readout type CCD image sensor 1. If the shutter control pulses are outputted by the shutter controlling circuit 10 at time points $t_1$ and $t_3$, the charge storage time in the all-pixel-readout type CCD image sensor 1 is shortened. The EVEN field component $sig_{1E}$ of the CDS picture signal $SIG_1$ and the ODD field component $sig_{2O}$ of the CDS picture signal $SIG_2$, read out from the all-pixel-readout type CCD image sensor 1 with the shortened charge storage time $T_1$ and outputted via the CDS processing circuits 6 and 8 from the horizontal transfer sections 4 and 5, are compressed at the high luminance portions, as shown in FIG. 4. Since the signal readout by the readout pulses RP occurs after the end of storage of the signal charges, the picture signals $sig_{1E}$ and $sig_{2O}$ are delayed by 1/60 sec from the real time.

On the other hand, the ODD field component $sig_{1O}$ of the CDS picture signal $SIG_1$ and the EVEN field component $sig_{2E}$ of the CDS picture signal $SIG_2$, normally exposed to light with the light exposure time $T_2$, without shortening the signal charge storage time, become through-picture signals with non-limited standard light exposure, as shown in FIG. 4. These through-picture signals $SIG_{1O}$ and $SIG_{2E}$ are also delayed by 1/60 second relative to the real time.

The picture signal $SIG_2$, outputted by the CDS processing circuit 8, is supplied to a field buffer memory 9 where it is further delayed by one field (1/60 second) and becomes a picture signal $SIG_2'$ as shown in FIG. 4. That is, the ODD field picture signal $sig_{2O}$, whose high luminance portion has been compressed, is further delayed and becomes a signal $sig_{2O}'$. The EVEN field through-picture signal $SIG_{2E}$ becomes $SIG_{2E}'$.

The picture signal $SIG_1$ outputted by the CDS processing circuit 6 and the picture signal $SIG_2'$ outputted from the field buffer memory 9 are synthesized by the synthesis circuit 7 to provide a synthesized picture signal $SIG_3$ of a broadened dynamic range comprised of ODD field synthesized picture signals $SIG_{3O}$ and EVEN field synthesized picture signals $SIG_3E$. This synthesized picture signal $SIG_3$ of the broadened dynamic range is encoded by the signal processing circuit 11 so that a picture signal $SIG_4$ of the broad dynamic range is outputted via output driver 12 at the output terminal 13.

The shutter control circuit 10 is explained in detail.

Figure 5:
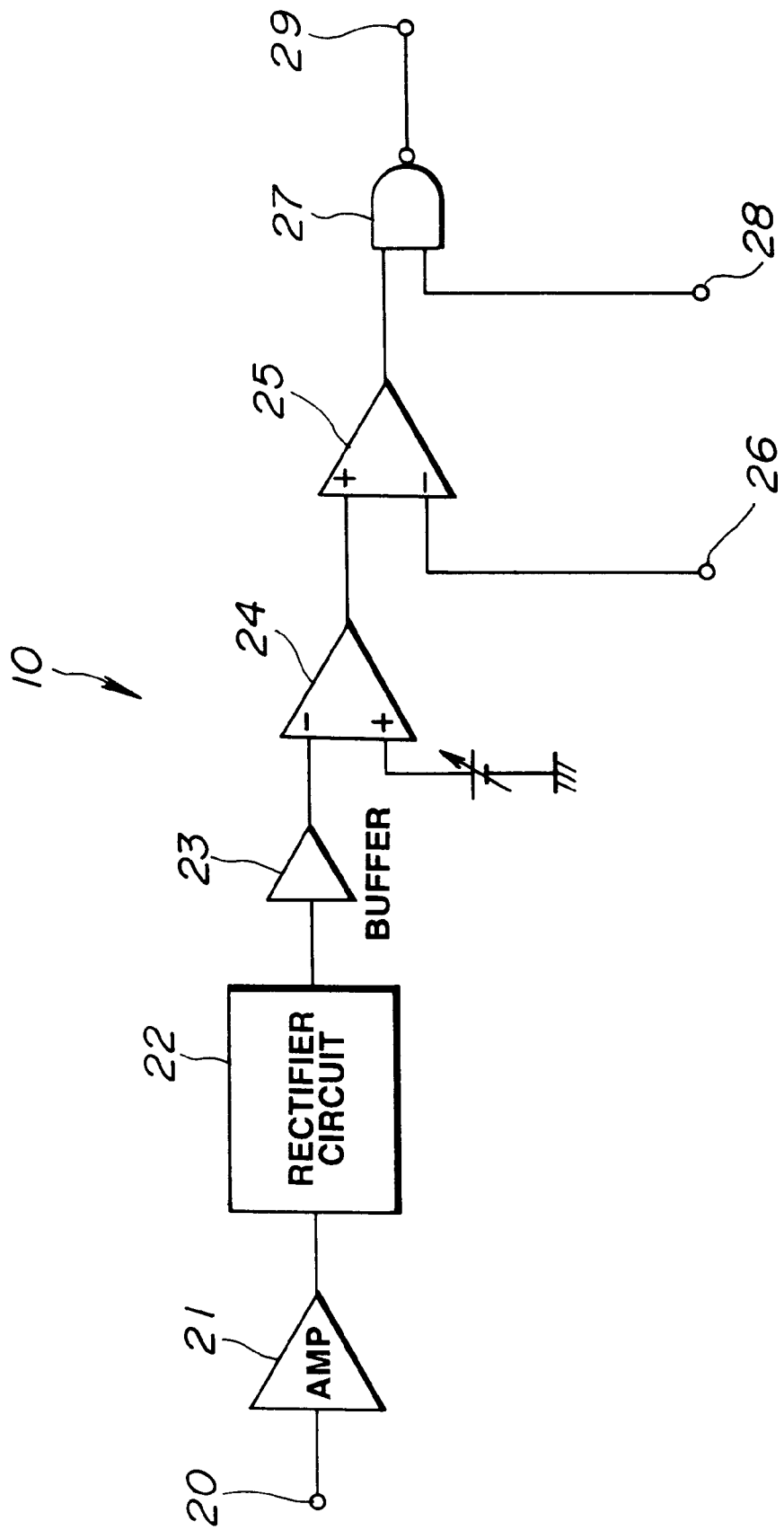
FIG. 5 is a detailed circuit diagram of a shutter control circuit of the first embodiment.

The shutter control circuit 10 controls the signal charge storage time of the all-pixel-readout type CCD image sensor 1 using the electronic shutter function. In effect, the shutter control circuit 10 generates shutter control pulses and transmits the pulses to the all-pixel-readout type CCD image sensor 1. Thus it is possible with the all-pixel-readout type CCD image sensor 1 to produce at least two picture signals $SIG_{1O}$, $sig_{1E}$ and $SIG_{2E}$, $sig_{2O}$ having different signal charge storage time durations. Referring to FIG. 5, the shutter control circuit 10 amplifies the picture signal $SIG_2$ supplied via the input terminal 20 by an amplifier 21 and rectifies the amplified signal by a rectifier circuit 22. The rectified signal is supplied via a buffer 23 to a negative input terminal of an operational amplifier 24. The positive terminal of the operational amplifier 24 is supplied with a variable voltage. An output of the operational amplifier 24 is supplied to a positive terminal of the operational amplifier 25. Since a signal shown in FIG. 6C is supplied to a negative terminal 26 of the operational amplifier 25, a shutter pulse gate signal as shown in FIG. 6D is outputted. A NAND gate 27 NANDs the shutter pulse gate signal and the shutter pulse shown in FIG. 6B to generate a shutter control pulse X-SUB shown in FIG. 6E. The shutter control pulse thus generated is supplied at an output terminal 29 to the all-pixel-readout type CCD image sensor 1. This allows to automatically control light exposure responsive to the incident light. With the shutter control circuit 10, the information on the incident light up to approximately 200 times as much as the standard light can be automatically controlled to the same signal level responsive to the incident light. FIG. 6A shows the vertical synchronization pulse VD. The shutter control circuit 10 may be configured by a micro-computer.

The synthesis circuit 7 will be explained in detail.

The synthesis circuit 7 synthesizes the CDS picture signal $SIG_1$, an output of the CDS processing circuit 6, and the picture signal $SIG_2'$, a buffer output of the field buffer memory 9, as explained previously. The synthesis circuit 7 may be any of a signal addition type synthesis circuit, shown in FIG. 7, a signal comparison synthesis type synthesis circuit, shown in FIG. 8, a signal domain switching type synthesis circuit, shown in FIG. 9, or a combination thereof.

The signal addition type synthesis circuit, shown in FIG. 7, is explained by referring to a waveform diagram of FIG. 10. The picture signal $SIG_1$, obtained with standard light exposure, is supplied via an amplifier 30 to a NAM circuit made up of transistors $Q_1$, $Q_2$. The NAM circuit white-clips the picture signal $SIG_1$. The white-clipped picture signal is added to a picture signal $SIG_2'$ compressed by a shutter operation responsive to the incident high luminosity light. A synthesized picture signal $SIG_3$ is outputted at the collector of a transistor $Q_3$. A bias voltage $V_0$ is supplied to the base of the transistor $Q_3$, while a white-clipped dc voltage of the picture signal $SIG_1$ is supplied to the base of the transistor $Q_2$. Heretofore, the information on luminosity not less than four or five times as much as the standard light vanished by clipping due to the maximum saturation charge quantity of the CCD device. Since the luminosity information having luminosity up to about 200 times as much as the standard light is left as the information with the signal addition type synthesis circuit 7, a wider dynamic range can be achieved. The compression information can be optimized if the white clipping point can be freely selected depending upon the incident light information or picture pattern.

Figure 8:
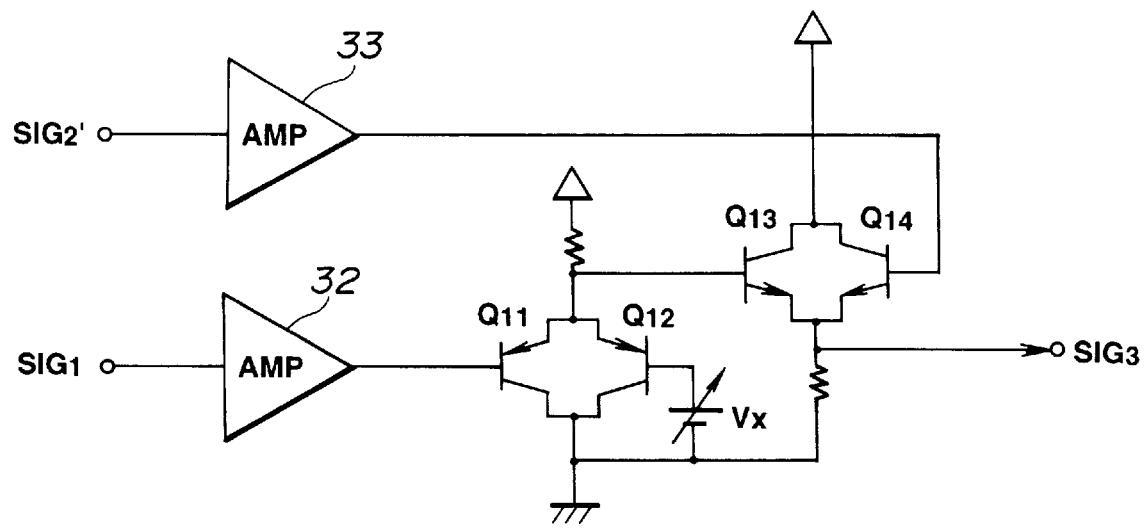
FIG. 8 is a circuit diagram showing a signal comparison synthesis type synthesis circuit of the first embodiment.

The signal comparison synthesis type synthesis circuit, shown in FIG. 8, is explained by referring to a waveform diagram of FIG. 11. This type circuit is suited if there are two significantly different incident light levels in the same picture, as when a person is to be imaged in backlight. The picture signals $SIG_1$ obtained with the standard light exposure, is fed via an amplifier 32 to a NAM circuit made up of transistors $Q_{11}$ and $Q_{12}$. The white-clipped picture signal and the picture signal $SIG_2'$ compressed by a shutter operation responsive to the incident high luminosity light are compared to each other by the NAM circuit made up of transistors $Q_{11}$ and $Q_{12}$. The NAM circuit, designed to output a larger level signal, outputs the picture signal $SIG_2'$ for the white-clipped domain of the synthesis signal $SIG_1$. The signal comparison synthesis type synthesis circuit outputs a synthesized picture signal $SIG_3$.

Figure 9:
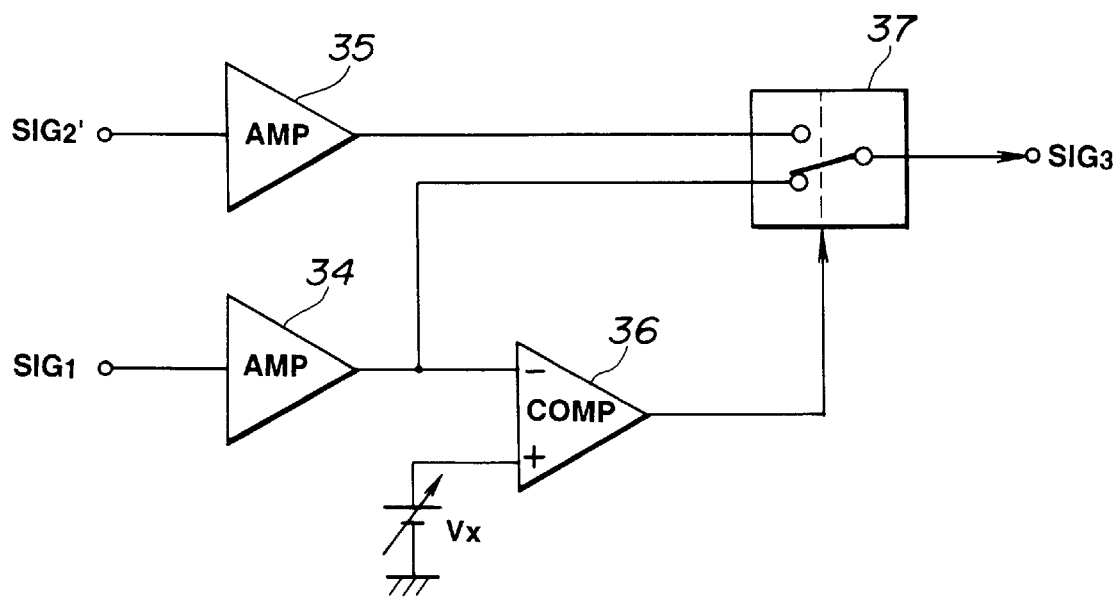
FIG. 9 is a circuit diagram showing a signal domain switching type synthesis circuit of the first embodiment.
Figure 12:
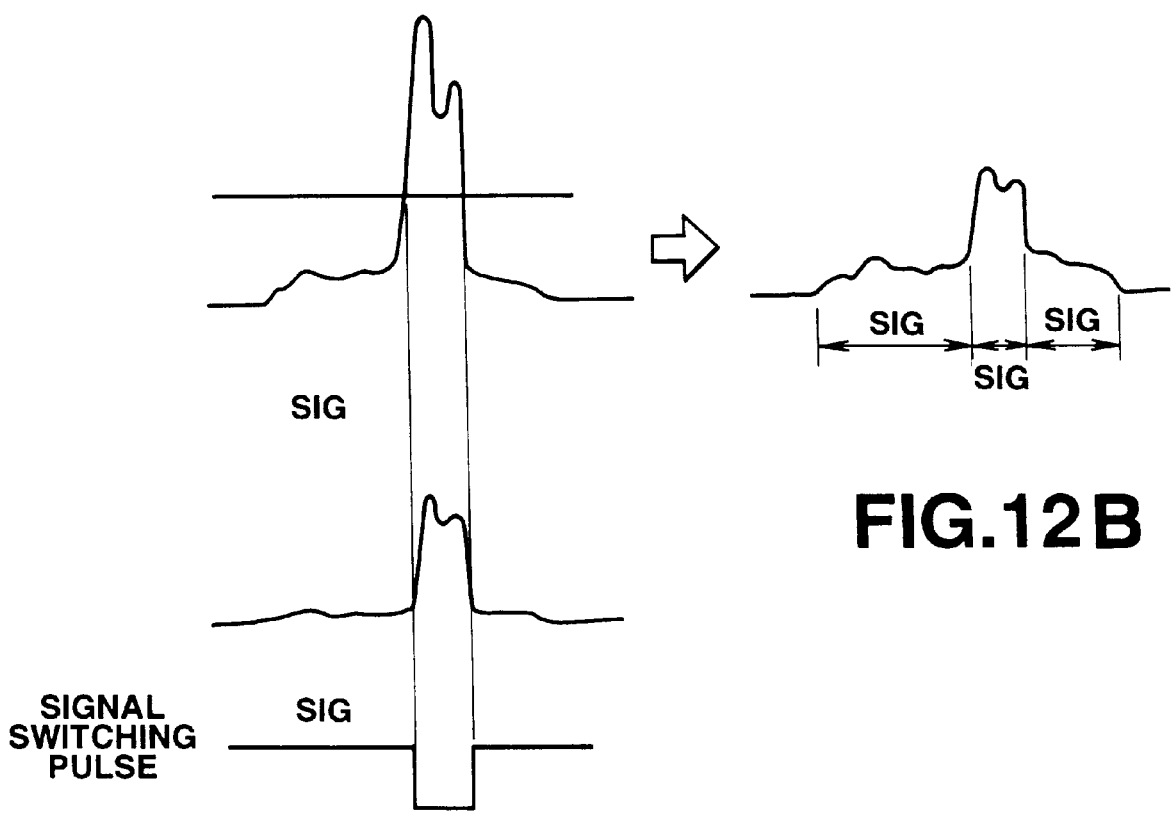
FIG. 12 is a waveform diagram for illustrating the operation of the signal domain switching type synthesis circuit shown in FIG. 9.

The signal domain switching type synthesis circuit, shown in FIG. 9, is explained by referring to a waveform diagram of FIG. 12. The picture signal $SIG_1$, obtained with the standard light, is supplied via an amplifier 34 to a comparator 36. The comparator 36 generates a signal switching pulse from the switching level dc voltage and the picture signal $SIG_1$. A switcher 37 switches between the picture signal $SIG_1$ and the picture signal $SIG_2'$, compressed by a shutter operation responsive the incident high luminosity light, in order to provide a compressed signal.

There is also a method in the synthesis circuit 7 consisting in compressing a signal by a shutter and passing the signal through an ordinary signal level compression circuit such as a knee circuit.

Figure 13A:
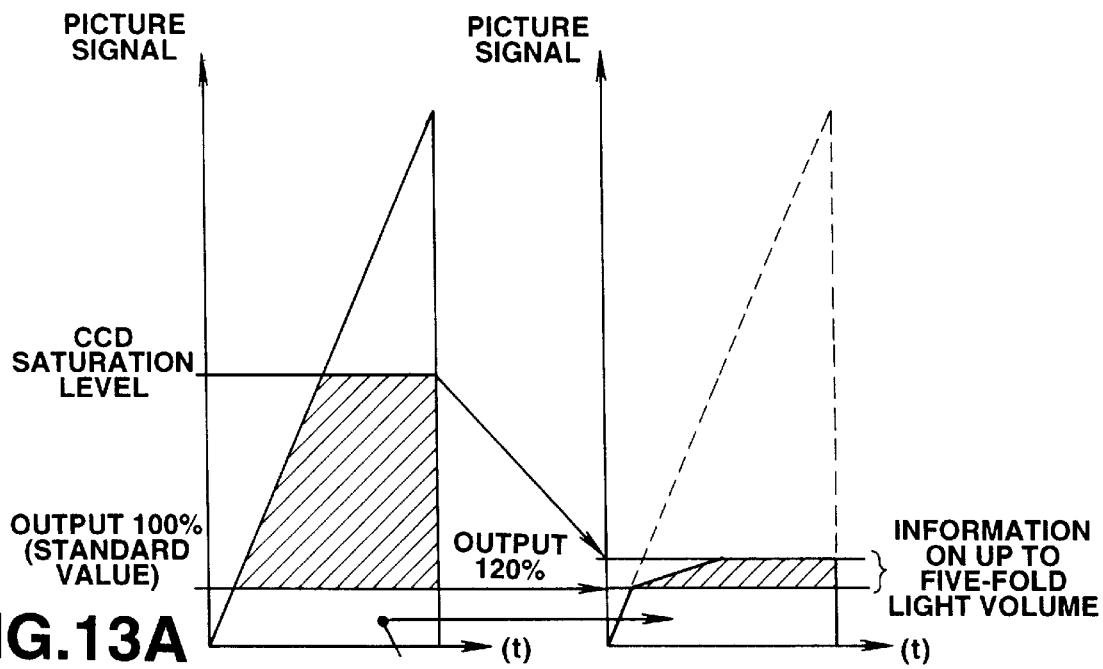
FIGS. 13A, 13B are graphs showing the effect of the first embodiment.
Figure 13B:
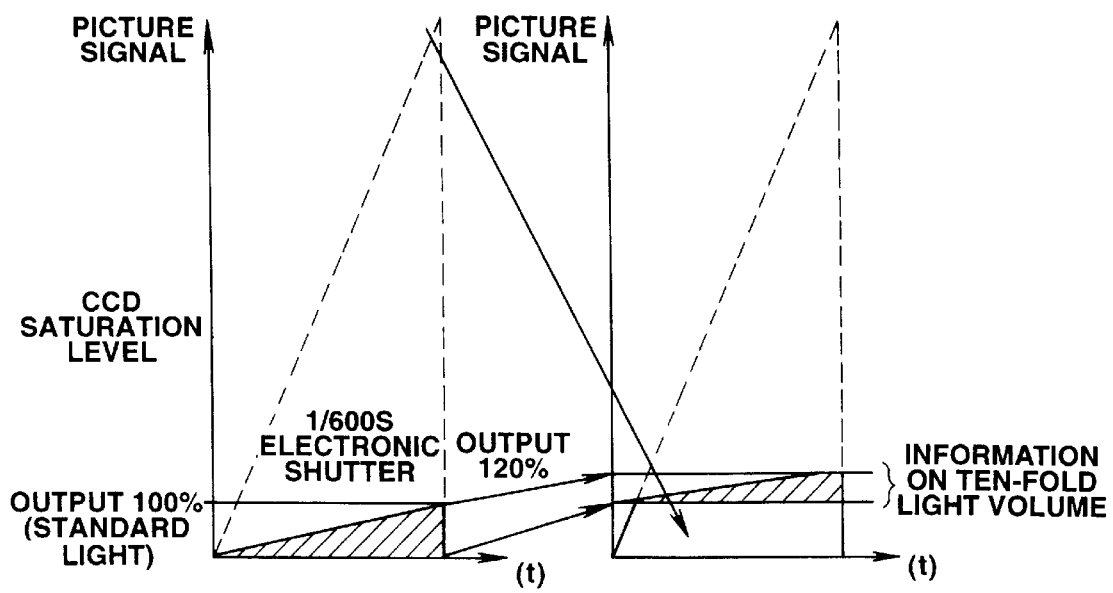

With the imaging apparatus of the above-described first embodiment of the present invention, having the all-pixel-readout type CCD image sensor 1, capable of producing at least two pictures by the shutter control circuit 10, and the synthesis circuit 7 for synthesizing these two pictures, the information of the ten-fold light volume, compressed by the ⅟₆₀₀ sec electronic shutter control, as shown in FIG. 13B, can be synthesized to a standard light. Thus, as compared to the conventional method in which the incident light is converted into picture signals and the CCD saturation level picture signals significantly exceeding the output 100% (standard light) are compressed by signal processing up to an output of 120%, as shown in FIG. 13A, the output level relative to the incident light can be significantly compressed to achieve a wider dynamic range. In addition, the compression ratio can be controlled easily, while the CCD charge quantity for standard operation can be set to a higher value to realize an improved S/N ratio.

Figure 14:
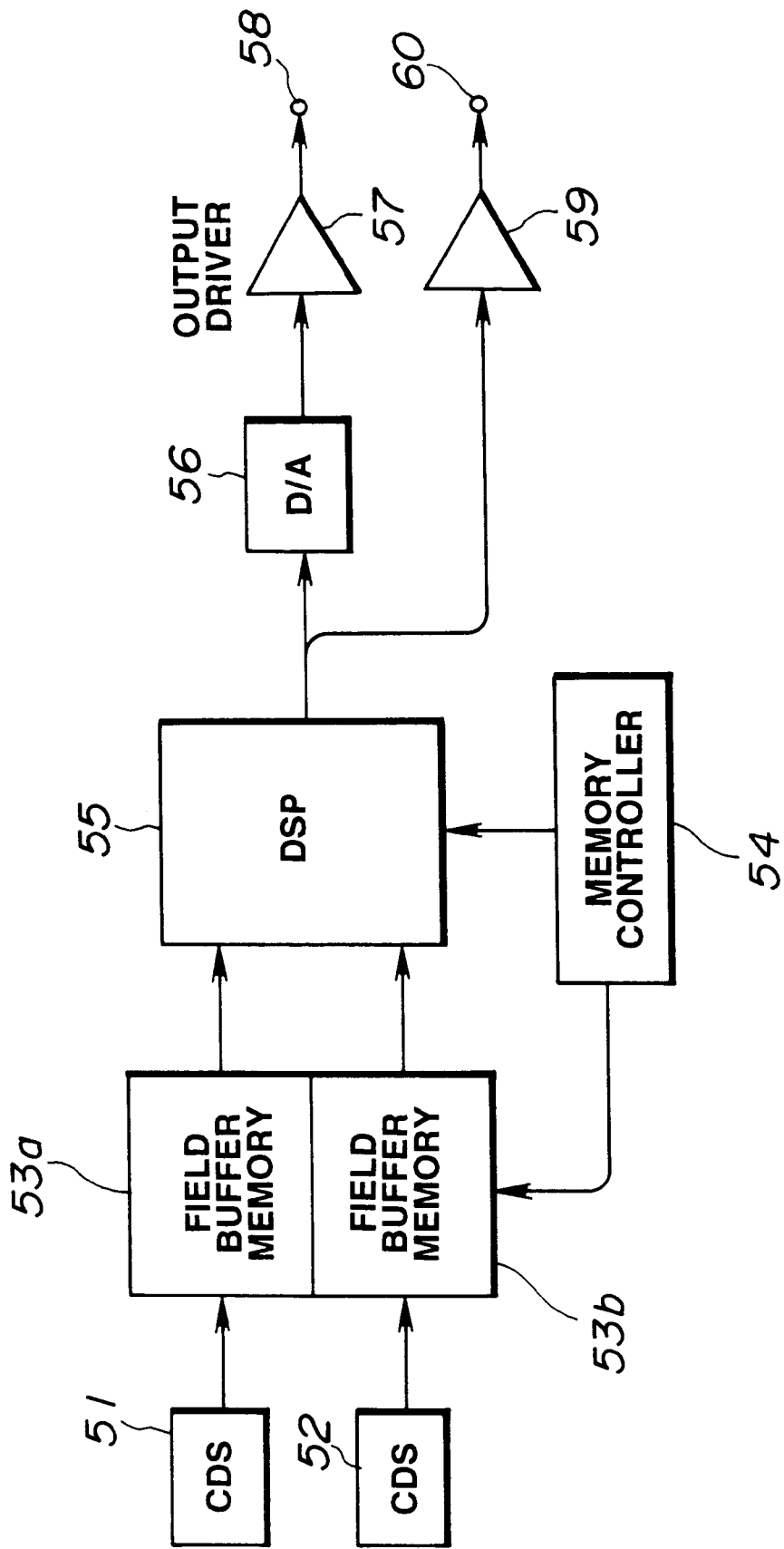
FIG. 14 is a block diagram illustrating a modification of the embodiment of the imager according to the present invention.

FIG. 14 shows a modification of an imaging apparatus according to the present invention.

In the present modification, picture signals from the all-pixel-readout type CCD image sensor 1 are freed of noise by two CDS processing circuits 51, 52 and output-limited by a field buffer memory 53, so that two picture output signals, which appear as if these signals were read out from the CCD image sensor with different charge storage time durations, are produced. These two picture signals are synthesized by a digital signal processor (DSP) 55 to output a synthesized picture signal having a wide dynamic range. The field buffer memory 53 is made up of two memory regions 53a, 53b and controlled as to the picture signal write/readout regions by a memory controller 54.

The synthesized picture signal, outputted by the DSP circuit 55, is converted by a digital/analog converter 56 into analog picture signals which are outputted at an output terminal 58 via an output driver 57. The synthesized picture signal, outputted by the DSP circuit 55, is directly outputted via an output driver 59 at an output terminal 60.

What is claimed is:

1. An imaging apparatus comprising:

solid-state imaging means for reading out two picture signals with different signal charge storage time durations via a vertical transfer section and via first and second horizontal transfer sections for outputting all-pixel picture signals on the field basis;

shutter control means operable when turned on for providing different signal charge storage time durations of said solid-state imaging means; and synthesizing means for combining one of the two picture signals produced when said shutter control means is turned off with the other of the picture signals produced when the signal charge storage time is shortened by said shutter control means.

2. The imaging apparatus as claimed in claim 1 wherein said synthesis means sums one of the two picture signals produced with the shutter control of said shutter control means being turned off to the other of the picture signals produced with the signal charge storage time shortened by said shutter control means.

3. The imaging apparatus as claimed in claim 1 wherein said synthesis means switches between one of the two picture signals produced with the shutter control of said shutter control means being turned off and the other of the picture signals produced with the signal charge storage time shortened by said shutter control means.

4. The imaging apparatus as claimed in claim 1 wherein said synthesis means comprises a first correlated double sampling circuit supplied with an output of said first horizontal transfer section, and a second correlated double sampling circuit supplied with an output of said second horizontal transfer section, said synthesis circuit synthesizing outputs of said first and second correlated double sampling circuits and outputting a resulting synthesized output.

5. The imaging apparatus as claimed in claim 4 wherein said synthesis means further comprises a field memory, an output of said second correlated double sampling circuit is temporarily stored in said field memory and wherein an output of said field memory and an output of said first correlated double sampling circuit are synthesized and outputted.

6. An imaging apparatus comprising:

solid-state imaging means for reading out two picture signals with different signal charge storage time durations via a vertical transfer section and via first and second horizontal transfer sections for outputting all-pixel picture signals on a field basis;

selectively actuable shutter control means for providing, when turned on, different signal charge storage time durations of said solid-state imaging means; and synthesizing means for adding one of the two picture signals produced when the shutter control means is turned off to the other of the picture signals produced when the signal charge storage time is shortened by said shutter control means.

7. An imaging apparatus comprising:

solid-state imaging means for reading out two picture signals with different signal charge storage time durations via a vertical transfer section and via first and second horizontal transfer sections for outputting all-pixel picture signals on a field basis;

shutter control means operable when turned on to provide different signal charge storage time durations of said solid-state imaging means; and synthesizing means for switching between one of the two picture signals produced when said shutter control means is turned off and the other of the picture signals produced when the signal charge storage time is shortened by said shutter control means.

* * * * *